Figure 1:
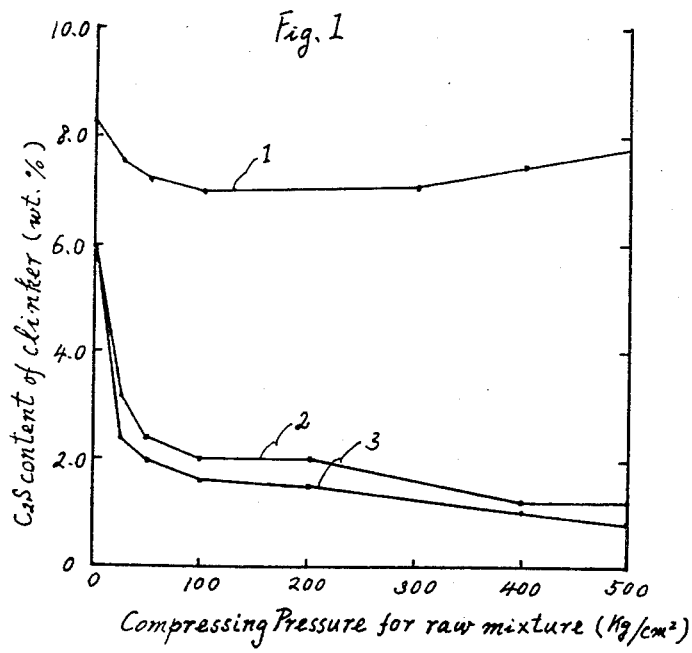

3,381,064
METHOD OF MAKING PSEUDOWOLLASTONITE
CLINKER WITH THE ROTARY KILN
Taro Yamaguchi and Fumiko Shido, Tokyo, Japan, assignors to Onoda Cement Co., Ltd., Onoda, Yamaguchi, Japan
Filed Nov. 30, 1966, Ser. No. 598,020
17 Claims. (Cl. 263—53)

This invention relates to a method for the preparation of pseudowollastonite clinker, wherein a raw mixture powder consisting of a limy raw material and of a silicic raw material together with some fluxes, is prepared, and then is formed into compact grains such as flakes, briquettes, pellets, lumps or clods and is sintered by using the rotary kiln at a temperature in the range of 1250°–1470° C.

Psuedowollastonite has composition $CaSiO_3$ and is stable at higher temperature than wollastonite having the same composition. The use of wollastonite as ceramic raw materials is known to result in a striking improvement in the process of making ceramics and the character of the products. Thus, its importance as ceramic industrial mineral has been increasingly appreciated in recent years. Our comparative study on the characters of pseudowollastonite and wollastonite as ceramic raw material have clarified that pseudowollastonite is rather superior to wollastonite for improving the process of making ceramics and the character of the products. The natural pseudowollastonite, however, occurs extremely rarely and cannot be used as an industrial raw material. Wollastonite occurs in nature, but the deposits are not enough to fill the demand of the whole ceramic industry.

Nobody has hitherto carried out the synthesis of pseudowollastonite in an industrial scale. We have, however, succeeded to produce pseudowollastonite by the fusion method which includes essentially the step of fusion of the raw material, followed by the crystallization of the fused melt into the mineral. The fusion method is, however, uneconomical. Thus, we investigated the sintering method instead and succeeded.

The synthesis of pseudowollastonite by sintering of a mixture of limy and silicic raw materials (hereafter to be called limy-silicic raw mixture) is extremely difficult, because the rate of formation of pseudowollastonite in solid-state reaction is very slow in the pure $CaO$—$SiO_2$ binary system. Even a prolonged heating of fine-grained limy-silicic raw mixtures cannot bring the reaction to completion. Even in clinker having molecular ratio with $CaO/SiO_2 \leq 1$ and heated for a longtime, free $CaO$, $2CaO \cdot SiO_2$ (hereafter to be called $C_2S$) and $3CaO \cdot 2SiO_2$ (hereafter to be called $C_3S_2$) are still preserved in large amounts. $C_3S_2$ is a mineral as useful as pseudowollastonite. Free $CaO$ and $C_2S$, however, are hydraulic and moreover the latter causes a striking volume change when polymorphic inversion takes place between the $\beta$- and $\gamma$-forms.

We investigated, therefore, the method to provide good clinkers with the content of free $CaO$ and $C_2S$ as low as possible in an industrial amount by the sintering method using the rotary kiln. To obtain good pseudowollastonite clinkers, the firing temperature should be kept within a siutable range of temperature. Firing at temperatures lower than the suitable range cannot give good clinkers within a period that is economically desirable in an industrial performances by the rotary kiln. When firing temperature becomes higher than the suitable range, it becomes impossible to keep firing operation continuously and constantly, because clinkers begin to melt to attach tightly to a kiln wall and agglomerate each other forming large blocks or large pillars, leading to closing the opening the kiln. In the production of pseudowollastonite clinkers from limy-silicic raw mixture, the suitable range of temperature is too narrow to be realized in an industrial production. This will be the reason why pseudowollastonite has not been hitherto produced by the rotary kiln. We have overcome such difficulties and succeeded in industrial production.

An object of the present invention is to provide a method of making pseudowollastonite clinker, wherein the limy and silicic raw materials mixed with a suitable amount of effective fluxes is granulated or pressed under a pressure higher than 50 kg./cm.$^2$ into lumps before calcination, and then is fired at the temperature higher than 1250° C. and thereby to facilitate the production of clinker of good quality by the sintering method using the rotary kiln. The method of making pseudowollastonite from natural wollastonite by mixing fluxes and forming lumps followed by sintering at the temperature higher than 1250° C. in the rotary kiln is also understood to be included in this invention. The fired clinker is crushed finely to be used as ceramic raw material.

Another object of this invention is to provide a method, wherein the raw mixture containing limy material, more than 50% by weight of which is composed of quick lime and/or slaked lime, is used, and thereby to increase the reactivity of the raw mixture.

Still another object of this invention is to provide a method, wherein the raw mixture containing silicic material, more than 50% by weight of which is composed of opal is used and thereby to increase the reactivity of the raw mixture.

A further object of this invention is to provide a method, wherein the raw mixture containing calcic raw material, more than 50% by weight of which is composed of quick lime and/or slaked line, and also containing silicic raw material, more than 50% by weight of which is composed of opal, is used and thereby to increase the reactivity of the raw mixture.

A still further object of this invention is to provide a method, wherein the raw mixture with limestone, as a calcic raw material pulverized together with quartzose raw material simultaneously in a mill, in order to greatly reduce the grain size of limestone, is used and facilitate the completion of sintering reaction.

A still further object of this invention is to provide a method, wherein the calcination of raw mixture is carried out with the rotary kiln, the sintering zone of which is lined with silica bricks and thereby to protect the lining refractory bricks from chemical erosion during firing and moreover to protect clinker itself from injurious contamination by refractory bricks during firing.

Another object of this invention is to provide a method, wherein the fired clinker is quenched from a temperature higher than 1150° C., and thereby to produce highly white clinker. The detailed specification of these methods and their effect will be given below successively.

As mentioned above, the slow rate of reaction and narrow range of firing temperature of limy-silicic raw mixtures make the industrial production with the rotary kiln difficult. Then, we investigated fluxes which form a small amount of liquid phase during firing, to accelerate effectively the reaction between grains of limy and silicic raw materials, and to lower the lower limit of suitable range of temperature, and to widen the range itself.

The fluxes found to be effective are compounds or glasses containing at least one of the following elements: Li, Na, K, Ba, Pb, Zn, Ti, Zr, Al, Fe, B and P. For example, they are oxides such as $Pb_3O_4$, $TiO_2$, $ZrO_2$, ZnO, $Al_2O_3$ and $B_2O_3$, hydroxides such as NaOH and KOH, alkalies such as bauxite minerals and limonites, carbonates such as $Na_2CO_3$, $K_2CO_3$, $BaCO_3$ and $PbCO_3$, fluorides such as $Na_3AlF_6$, phosphates such as apatite, $Na_4P_2O_7$, $BPO_4$ and $(NH_4)_3PO_3$, borates such as borax, silicates such as zircon, and alumino-silicates such as clay minerals, micas, feldspars, petalite, spodumene, tourmaline and mullite. Natural rocks, artificial slags and glasses containing the said elements are also used preferably.

In practice, one or more of these fluxes is or are mixed well with limy-silicic raw materials before firing. A quantity, here called "effective amount" of the admixed fluxes has to be defined. The "effective amount" means the total amount of oxides of pertinent elements contained in the fired clinkers.

The fluxes may well be classified into two groups: group A containing elements such as Li, Na, K, Ba, Pb, B and P, and group B containing elements such as Al, Fe, Zn, Ti and Zr. When the effective amount of admixed fluxes is in the range to be described below for each group of fluxes, the reaction between limy and silicic grains is so promoted that the firing temperature is lowered and/or the firing time is shortened and the suitable range of firing temperature is widened as well.

For fluxes of group A, the sum of the contents of $Li_2O$, $Na_2O$, $K_2O$, $B_2O_3$, BaO, $Pb_2O_3$, and $P_2O_5$ is preferred to be 0.5–4.0%.

For fluxes of group B, the sum of the contents of $Al_2O_3$, $Fe_2O_3$, ZnO, $TiO_2$, and $ZrO_2$ is preferred to be 1.0–6.0%.

We found it more effective to use mixtures of fluxes of both A and B groups. In this case, the effective amount of fluxes of either group A or B must be larger than the above-mentioned lower limit defined for the group. On the other hand, the effective amount of group A as well as group B must be lower than the above-mentioned upper limit defined for the individual groups.

It is undesirable to use fluxes in an amount in excess of the above range, because if the amount of admixed fluxes exceeds the range, the agglomeration temperature becomes lower remakably and hence the suitable range of firing temperature becomes narrower.

Limy and silicic raw materials usually contain some amounts of the same elements as the above defined fluxes. These amounts should be regarded as a part of fluxes in the calculation of the effective amount.

The admixture of $CaF_2$ in raw materials largely inhibits the formation of psedowollastonite and hence the contamination of raw mixtures with $CaF_2$ is undesirable. However, the use of a small amount of the above-mentioned fluxes rescues from harm of $CaF_2$.

The object of the invention is to synthesize pseudowollastonite clinkers with free CaO and $C_2S$ contents as low as possible. It is recommended that the molecular ratio $CaO/SiO_2$ in the raw mixtures be in the range 0.5–1.0, in order to synthesize clinker with a high content of pseudowollastonite and with as low contents of free CaO and $C_2S$ as possible. If the molecular ratio in the raw mixture is higher than 1.0, the obtained clinker contains injurious free CaO and $C_2S$ in a large amount. On the other hand, the firing of the raw mixture with the ratio lower than 0.5 results in a decrease of pseudowollastonite in the clinker and an increase of silica minerals. Some of the fluxes may combine with silica to form silicates during firing or may form a small amount of glass with molecular ratio $CaO/SiO_2<1$, causing a deficiency in the amount of silica available for the formation of $CaSiO_3$. In such a case, due caution must be exercised so as to add enough silicic raw materials to compensate the consumption. MgO is commonly contained in limy raw materials in a quantity up to 5%. Its crystallochemical behaviors and effects are very similar to those of CaO, and hence the amount of MgO can be added to that of CaO and the whole is treated here as CaO.

The use of some fluxes injurious for making particular ceramics of good qualities must, of course, be avoided. For example, when colorless clinkers are desired, the $Fe_2O_3$ content of clinkers is recommended to be lower than 0.6%. Our investigation about the relationship between the $Fe_2O_3$ content and the color of powdered clinker clarified that powdered clinkers with the $Fe_2O_3$ content lower than 0.6%, are highly white, but they become colored with increasing amount of $Fe_2O_3$ over 0.6%. On the contrary, when colored clinkers are desired, one compound or more containing one metal element or more such as Fe, Co, Ni, Cr, Mn, Cu, Sb, Pb and Sr may be added as coloring agents to raw mixtures before firing.

The method of this invention will be better understood from the following detailed description thereof, taken in conjunction with the accompanying drawings, in which:

FIG. 1 shows the relationship between the compression pressures of the raw mixtures containing quartz as the silicic raw material and various kinds of limy raw materials on the one hand and the contents of $C_2S$ in the clinkers obtained therefrom on the other. Curves 1, 2 and 3 indicate the case where limestone, quick lime and slaked lime were used as limy raw materials respectively.

Figure 2:
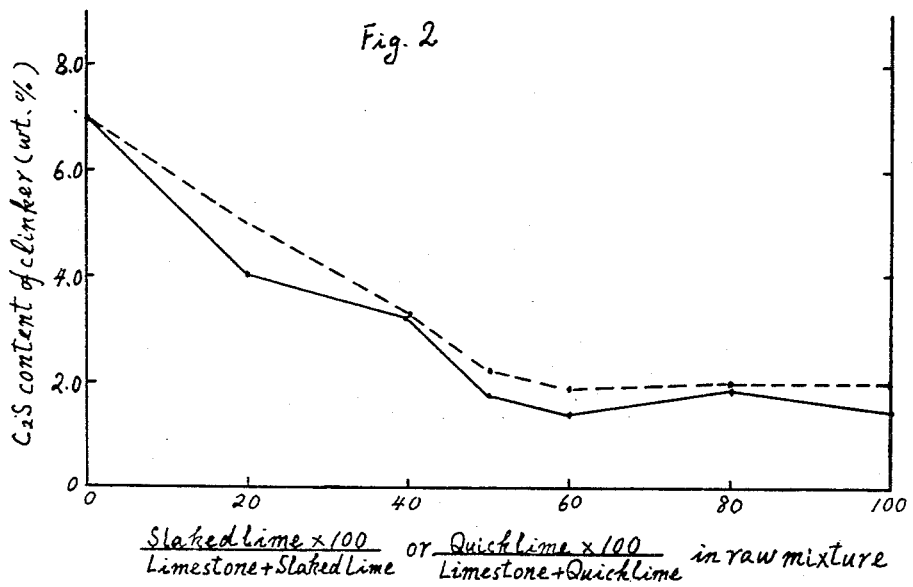

FIG. 2 shows the relationship between the contents of quick lime and slaked lime in limy raw materials and the contents of $C_2S$ in the clinker obtained. A full line shows the relationships between the content of quick lime in the quick lime-limestone mixtures and the contents of $C_2S$ in the clinker obtained and a dotted line shows the relationships between the content of slaked lime in the slaked lime-limestone mixtures and the content of $C_2S$ in the clinker obtained.

Figure 3:
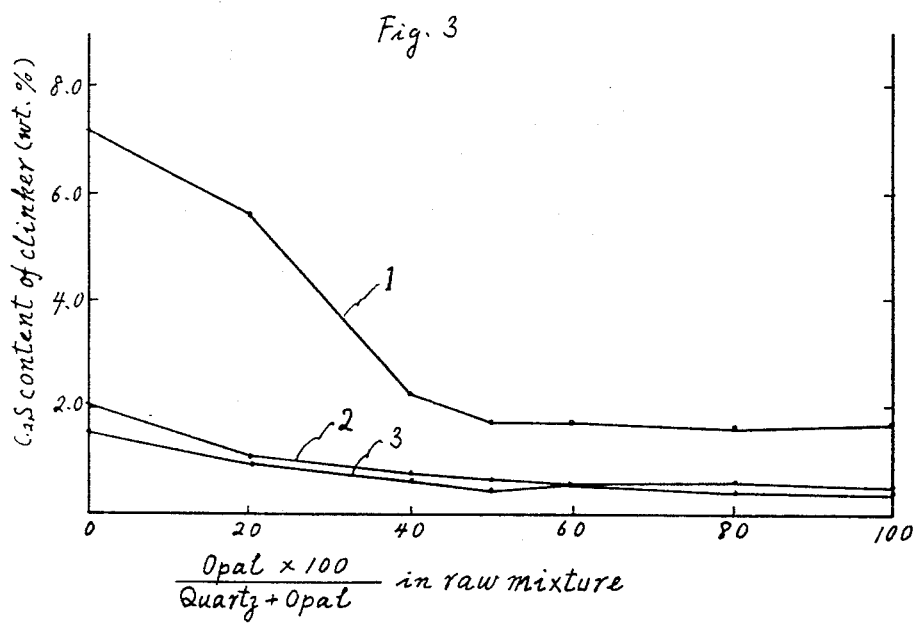

FIG. 3 shows the relationships between the content of opal in the silicic raw material and the contents of $C_2S$ in the clinkers obtained. Curves 1, 2 and 3 indicate the cases where limestone, quick lime and slaked lime were used as the limy raw material respectively.

FIG. 4(a), (b) and (c) show the relationships between milling time of raw mixtures and the contents of free CaO in clinkers obtained therefrom by the firing at 1340° C., 1360° C. and 1380° C. respectively. Black circles and crosses indicate the contents of free CaO in clinkers obtained from the raw mixtures with chert and opal as the silicic raw material respectively. Full lines show the heating of the raw mixtures for 10 minutes and dotted lines for 20 minutes at given temperatures.

FIGS. 5(a) and (b) show the change of the amount of 88μ sieve residue with increasing time of milling of the raw mixtures in the case where opal and quartzose chert were used as silicic raw materials respectively. A full line represents the amount of 88μ sieve residue of the raw mixture as a whole, and a dotted line represents that of limestone of the raw mixture.

The experimental results will be given below as illustrative of the effect of pertinent fluxes for the formation of pseudowollastonite during firing.

The chemical compositions and grain sizes of limestone and quartzose sand employed are shown in Table 1. A raw mixture of molecular ratio $CaO/SiO_2=0.95$ was prepared from them, and 0.5–15% of various fluxes were added to it and well mixed, and then moistened with 7% of water. The resulting mixtures were pressed with the compressive force of 100 kg./cm.² into pellets, 15 mm. in diameter and 7 mm. in height. The pellets were placed in an electric furnace and heated at 1300° C. for 30 minutes. The constituent minerals of clinkers thus obtained were determined by using a polarization microscope and by the X-ray powder diffraction method.

TABLE 1

| Items | Ig. loss (percent) | Qhemical compositions (percent) | | | | | | Grain sizes residue on 88μ sieve (percent) |
|---|---|---|---|---|---|---|---|---|
| | | $SiO_2$ | $Al_2O_3$ | $Fe_2O_3$ | CaO | MgO | $Na_2O+K_2O$ | |
| Raw materials: | | | | | | | | |
| Quartzose sand | 2.0 | 96.9 | 1.0 | 0.05 | 0.3 | 0.3 | 0.04 | 1.2 |
| Limestone | 43.7 | 0.3 | 0.1 | 0.07 | 55.0 | 1.1 | 0.2 | 1.0 |

The approximate content of pseudowollastonite and $C_2S$ minerals in clinkers were shown in Table 2. The content of pseudowollastonite in the clinkers from the raw mixture without fluxes was no more than 40%, whereas those of all the clinkers from the mixtures with pertinent fluxes were more than 80%. The results given in Table 2 also

TABLE 2

| Species of fluxes | Amount of fluxes added (percent) | Mineral contents of clinkers (percent) | |
|---|---|---|---|
| | | Pseudowollastonite | $C_2S$ |
| $Pb_2O_2$ | 5 | 85 | Tr. |
| ZnO | 5 | 85 | 0 |
| $TiO_2$ | 5 | 80 | 0 |
| $ZrO_2$ | 10 | 80 | 0 |
| $Al_2O_3 \cdot 3H_2O$ | 5 | 80 | 5 |
| NaOH | 3 | 90 | 0 |
| $K_2CO_3$ | 5 | 90 | Tr. |
| $BaCO_3$ | 5 | 90 | 0 |
| $Na_3AlF_6$ | 3 | 90 | 0 |
| $B_2O_3$ | 2 | 90 | 0 |
| $B_2O_3$ | 0.5 | 80 | 3 |
| $BPO_4$ | 3 | 100 | 0 |
| $Na_2B_4O_7$ | 3 | 90 | 0 |
| $BaO \cdot 2B_2O_3$ | 3 | 90 | 0 |
| $(NH_4)_3PO_4$ | 5 | 90 | Tr. |
| $PbO \cdot Al_2O_3 \cdot SiO_2$ | 5 | 85 | Tr. |
| Rhyolite a | 15 | 80 | 0 |
| Kaolin a | 10 | 80 | 3 |
| Tourmaline a | 13 | 90 | 0 |
| K-feldspar a | 15 | 80 | Tr. |
| $CaF_2 \cdot B_2O_3$ | 5 | 90 | 0 |
| $CaF_2$ b | 5 | 15 | 20 |
| Blank | 0 | 40 | 40 | a The contents of oxides showing fluxing action in the materials concerned are as follows: Rhyolite: $Na_2O=6.6$, $K_2O=5.3$, $Al_2O_3=$ Tourmaline: $Na_2O=1.8$, $Al_2O_3=23.5$, $B_2O_3=8.0$; Kaolin: $Al_2O_3=35.6$; K-feldspar: $K_2O=12.2$, $Na_2O=3.3$, $Al_2O_3=18.2$.
b An example showing that $CaF_2$ inhibits the formation of pseudowollastonite.

show that without using the defined amount of pertinent fluxes one could not obtain good clinker from the raw material comprising pure limy and silicic raw materials, even though the raw mixture is formed into compact grains before firing. The result also shows that $CaF_2$ awfully inhibits the formation of pseudowollastonite, but the addition of small amounts of pertinent fluxes rescues from the injury by $CaF_2$.

In firing the raw mixture admixed with fluxes, the firing temperature is recommended to be higher than about 1250° C., because if the firing temperature is lower, prolonged heating becomes needed. Prolonged heating, however, is practically impossible so far as the rotary kiln is used.

In the experiment mentioned above, the relation between the temperature and the time of firing appropriate for obtaining good clinkers was also investigated. The investigation was made on several of the raw mixtures shown in Table 2. The results were as follows:

Firing time needed for obtaining clinkers with less than about 10% of $C_2S$

Firing temperature, ° C.:
1400 _____ min__ 10
1300 _____ min__ 30
1250 _____ min__ 60
1200 _____ hrs__ >2

Thus, it follows that the firing temperature lower than 1250° C. cannot be used so far as the sintering method by the rotary kiln is adopted.

The firing temperature should be lower than the lowest agglomeration temperature. The lowest agglomeration temperature, i.e. the upper limit of firing temperature, depends upon the kinds of fluxes and their amount admixed. Among the lowest agglomeration temperatures for various ingredients pertinent to this invention, the highest one is about 1470° C., and hence the firing temperature is recommended to be lower than 1470° C.

In industrial practice, it is recommended that before firing in the rotary kiln, the raw mixture be granulated or pressed under a compressive force more than about 50 kg./cm.² with water or other binders if needed. Rotary kiln hitherto has not been successful in producing good clinkers from the raw mixtures in powder state, even though abovementioned fluxes are added before calcination. When the firing is made at temperatures where powder raw material shifts smoothly within a rotary kiln, the reaction cannot be brought into completion. On the other hand, if the firing temperature is made a little higher for obtaining good clinkers, agglomeration takes place, which leads to closing the opening of the rotary kiln.

The above-mentioned improved method effectively promotes the firing reaction, elevates the heat conductivity of raw mixtures, reduces troubles due to the agglomeration of clinkers and to the formation of kiln rings, and also reduces the heat-loss, material-loss and troubles due to the generation of dust in the burning kiln.

In the present sintering reactions with a small amount of liquid phase, the shorter the distance between raw material grains, the faster the completion of reaction. Granulation or press of raw mixtures makes the distance shorter and hence the reaction of formation of pseudowollastonite is fastened. In other words, the improved method lowers the firing temperature and widen the suitable range of firing temperature. Thus, the method permits the firing of pseudowollastlonite clinkers at temperatures fairly lower than the agglomeration temperature. Moreover, by granulating or pressing, the porosity of the raw mixture becomes small and hence, its apparent heat conductivity becomes higher. Furthermore, the shift of the charge in the rotary kiln becomes uniform and hence the partial melting caused by partial over-heating, which cannot be avoidable in raw powder mixtures, can be avoided in this method. The powder raw mixtures generate the ring remarkably, which sinters hard without scaling off during firing and is grown up to close the opening of the rotary kiln. These disadvantages are also overcome by using granulated or pressed raw mixtures. Thus, the method makes it possible to produce pseudowollastonite clinkers continuously and constantly with the rotary kiln by the above-mentioned effects combined.

Lumping is advantageously done with water or with one or more out of commercial binders, such as starch, cellulose, seaweed, mineral and vegetable oils, spent liquor from pulp-making, water glass, and plastic clay. These binders are effective for making stronger lumps and hence for avoiding ring-formation and dust-generation in the kiln. If any binder be used in pressing of the raw mixture, the amount of the binder used should not be so excessive as to cause bleeding under the applied pressure. For example, the amount of water as a binder should be kept to be less than about 8% by weight of the raw mixture. In pressing, compressive force more than 25 kg./cm.² effectively elevates the reactivity of raw mixtures. In practice, however, compressive force more than 50 kg./cm.² is needed for avoiding to break in the course of transportation or within the firing apparatus.

The next improved method relates to accelerating the firing reaction by using specified raw materials. Our investigation on the reactivity of various raw materials clarified that quick lime and slaked lime have better reactivity in comparison with limestone, and opaline silica in comparison with quartz. Thus, the use of quick lime or slaked lime instead of limestone and also of opaline silica instead of quartz is effective in accelerating the firing reaction, and hence permits to lower the firing temperature or shorten the time of firing. Further investigation clarified that the use of limy raw materials which contain quick lime and slaked lime more than 50% in total amount is as effective as that of limy raw materials composed of quick lime or slaked lime exclusively, and also that the use of silicic raw materials which contain opal more than 50% is as effective as that of silicic raw materials composed of opal exclusively. Opal, here so called, is the materials composed of cristobalite, tridymite or amorphous silica or their mixtures.

The following experimental results are given as illustrative of the statement mentioned above. The chemical compositions and grain sizes of raw materials employed are shown in Table 3. In order to get clinker with the composition shown in Table 4, they are mixed in various ratios, typical cases of which are shown in Table 5. A sample about 3 gr. in weight of each of raw mixtures was heated in an electric furnace at 1360° C., for 20 minutes, after pelletized under various compressive pressures. The $C_2S$ contents of clinkers were determined under the polarization microscope and are considered as a measure of the degree of incompletion of the firing reaction. FIG. 1 shows that the reactivity of each raw mixture becomes markedly higher when the compressive pressure becomes 25 kg./cm.$^2$ or more, and also that the raw mixtures with quick lime or slaked lime have higher reactivity than in those with limestone in the whole range of pressure examined and the increase of the reactivity with the increase of the pressure is especially clear in them. In FIG. 1, the compressive pressure 0 means the unpressed powder state.

Next, the same raw mixtures are moistened with 15–20% of water (or alcohol for the raw mixture containing quick lime), and granulated by rotating a drum-type apparatus, 300 mm. in diameter and 200 mm. in length with 3 ridges of lifter inside, at the rate of 25 r.p.m. and then heated likewise. This experiment clarified that the strength of granulated pellets and their reactivity are compared with those of the pellets made under a compressive pressure over 100 kg./cm.$^2$ without water.

Next, the powder raw mixtures with quartz and limy raw materials composed of various contents of quick lime or slaked lime were prepared and pelletized under a constant pressure of 200 kg./cm.$^2$ and then heated likewise. As may be seen from FIG. 2, the $C_2S$ content of clinkers is distinctly lower when the limy raw materials contain less than about 50% of limestone as compared with the limy raw materials containing over 50% of limestone.

TABLE 3

| Items | Ig. loss (weight percent) | Chemical composition (wt. percent) | | | | 88μ sieve residue (wt. percent) |
|---|---|---|---|---|---|---|
| | | SiO$_2$ | Al$_2$O$_3$ | Fe$_2$O$_3$ | CaO | |
| Raw materials: | | | | | | |
| Quartz | | 97.5 | 2.0 | 0.5 | | 1.0 |
| Limestone | 43.8 | 0.4 | 0.2 | 0.1 | 55.5 | 0.9 |
| Quick lime | | 0.7 | 0.4 | 0.2 | 98.7 | 1.0 |
| Slaked lime | 25.5 | | 0.14 | 0.14 | 74.4 | 1.0 |
| Clay | 6.5 | 78.3 | 15.0 | 0.2 | | 0.7 |
| Opal | 5.7 | 90.8 | 3.0 | 0.3 | 0.1 | 1.0 |

TABLE 4

[Weight percent]

| | SiO$_2$ | CaO | Al$_2$O$_3$+Fe$_2$O$_3$ |
|---|---|---|---|
| Chemical composition of clinker | 53.0 | 44.5 | 2.5 |

TABLE 5

[Weight proportion]

| Items | Quartz | Limestone | Slaked lime | Quick lime | Clay |
|---|---|---|---|---|---|
| Nos. of mixture: | | | | | |
| 1 | 1.000 | 1.654 | | | 0.147 |
| 2 | 1.000 | | 1.252 | | 0.177 |
| 3 | 1.000 | | | 0.944 | 0.147 |

The reason why quick lime and slaked lime is better than limestone for the completion of reaction may be the following. Limestone suffers decarbonation accompanied by a large absorption of heat near the sintering temperature and hence sintering reaction takes place only in part of the firing time. Quick lime and slaked lime, however, are free from such a disadvantage. Lime and slaked lime are more brittle and deform more easily than limestone, and therefore in the raw mixtures with quick lime and/or slaked lime, higher density or shorter distance between grains of raw materials is attained under compressive pressures. It increases the heat conductivity and reactivity of raw mixtures. As shown in FIG. 1, in raw mixtures with limestone, too high compressive pressure rather retards the completion of reaction. This may be attributed to that the higher pressure tends to make narrower the pore space through which $CO_2$ gas is expelled during decarbonation, and hence retards the decarbonation. In raw mixtures with quick lime or slaked lime, however, such a phenomena has not been found.

The use of raw mixture pellets, calcic material in which contains less than 50% of limestone, is especially preferable for the production by the rotary kiln. In other words, the reduction or total absence of heat absorption near the sintering zone mentioned above leads to lengthening the highest temperature zone in the kiln and hence to lengthening the reaction time, and in this way good clinkers can be produced at a lower firing temperature without danger of agglomeration.

Next, the powder raw mixtures with silicic materials composed of various contents of opal were prepared and pelletized under a constant pressure of 200 kg./cm.$^2$ and then heated likewise. As may be seen from FIG. 3, the $C_2S$ content decreases with increasing amount of opal in the silicic raw materials, and the reactivity of raw mixtures with silicic materials, 50% or more of which is composed of opal, is comparable with that composed of opal exclusively. Such tendency is especially conspicuous in the raw mixtures with limy raw material composed of limestone. The reason why the raw mixtures containing opal are more reactive than those not containing may be as follows. Constituent minerals of opal, i.e. cristobalite, tridymite and amorphous silica, are somewhat similar to glass in structure and melt more easily than quartz. The raw mixtures with opal generate a small amount of liquid phase at lower temperature and in larger amount than those without opal and the liquid phase accelerates the sintering reaction.

The grain size of pulverized raw materials should be as fine as possible, because the finer the grain size, the larger the reaction rate. In the synthesis of pseudowollastonite, the finer grain size of limy raw material is especially effective for obtaining good clinker. In industrial practice, however, pulverizing raw materials into extremely fine powder is extremely difficult. From the practical point of view, it is preferable that the silicic raw material is grounded so that the residue becomes less than 8% by weight and the calcic raw material so that the residue becomes less than 4% by weight on the 88μ sieve.

The raw mixtures composed mainly of limestone and quartz is lowest in the reactivity. In these mixtures, in order to improve the reactivity it is recommended that limestone and quartzose raw materials be pulverized simultaneously in a mill. Quartzose materials here called include all the materials composed mainly of quartz, such as chert, sandstone, natural quartz sand, granite, gneiss and quartzose rocks derived through silicification. Calcite of limestone can be crushed by compressive, impact or abrasive forces more easily than quartz. When limestone and quartzose materials are pulverized together with the ball mill, swing mill, or roller mill, quartz grains act as grinding media against limestone grains, and consequently the grain-size of limestone is greatly reduced. Thus, good clinkers can be easily produced by using raw mixtures prepared in this way.

The effect of the above-mentioned improved method is illustrated in the experiment to be mentioned below. A chert and an opaline rock were used for experiment. The former is a representative of the quartzose silicic raw materials and the latter is that of soft non-quartzose ones. The opaline rock used here is of volcanic origin and is composed of cristobalite and tridymite with a small amount of amorphous silica. The chemical compositions of the raw materials used, are shown in Table 6. Each of them were crushed with a jaw crusher into powders which passed through the 1.3 mm. sieve, and then the powders were mixed at the proportion shown in Table 7 in order to get the clinkers of the chemical composition shown in Table 8. Aplite and kaolin clay are used as fluxes and the former is composed of feldspar and quartz, and the latter of kaolinite and quartz. Pulverization of 5 kg. of raw mixtures was done with a open-circuit ball mill, 390 mm. in length and 440 mm. in diameter, with 15 kg. of porcelain balls as grinding media. A small amount of sample was picked out of the mill at times in the course of milling, and the grain size was examined by the 88 and 44μ wet-sieves. These samples were moistened and granulated into pellets 10 mm. in diameter and dried, and then heated at 1340° C., and 1380° C. for 10 or 20 minutes in the electric furnace. The contents of free CaO of clinkers thus obtained were determined by the chemical analysis and those of $C_2S$ and other constituent minerals by the powder X-ray diffraction method and by the polarization microscope. The content of free CaO and that of $C_2S$ in clinkers vary sympathetically. The content of free CaO is, here, considered to be a measure of the degree of incompleteness of the firing reaction.

Figure 4:
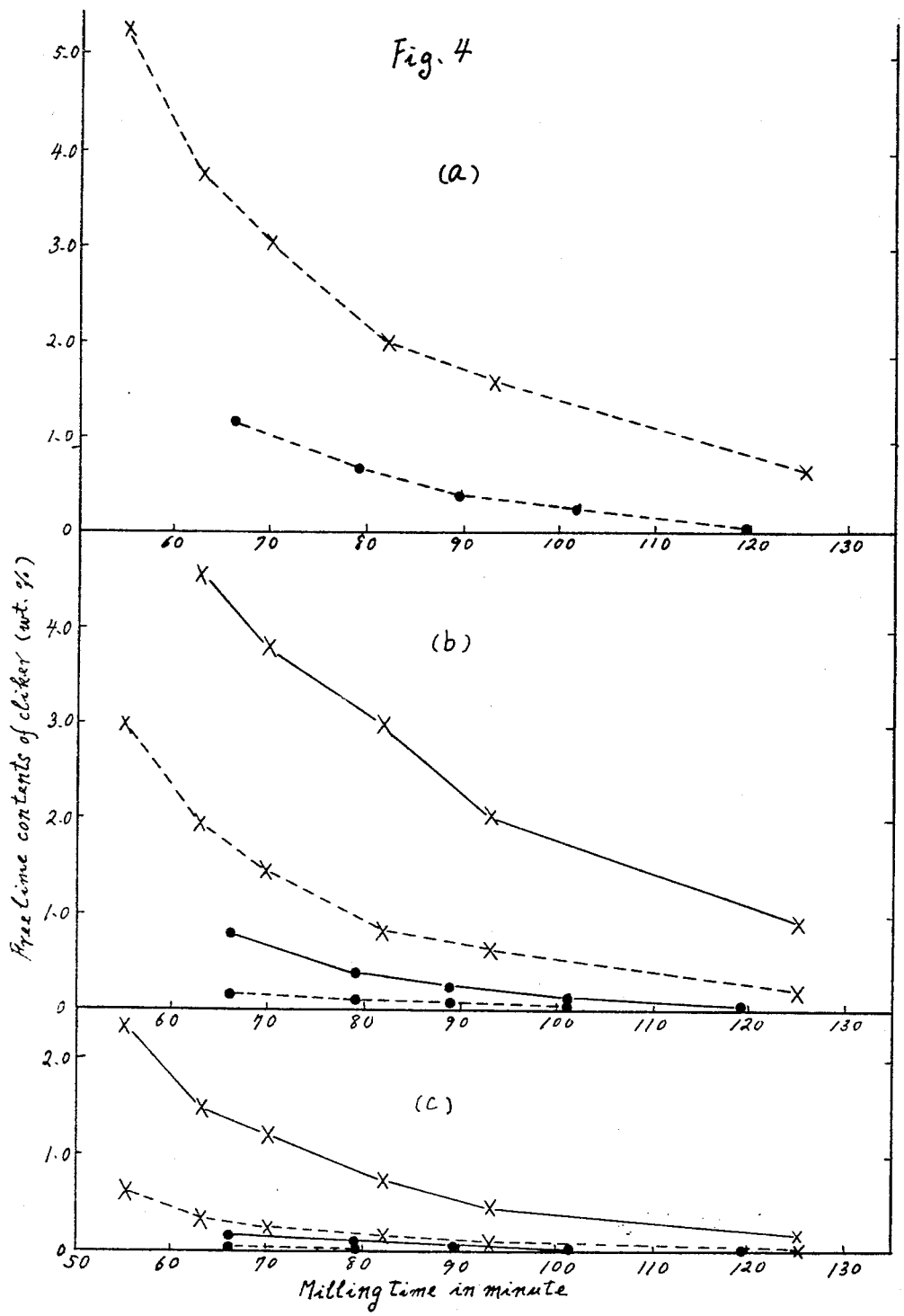

FIG. 4 shows the relation between milling time of raw mixtures and the contents of free CaO in clinkers obtained therefrom. The figure shows that the free CaO contents of clinkers from quartzose raw mixtures are lower than that from non-quartzose ones. In other words, the reactivity of the former mixtures is higher than the latter when the milling conditions for both are the same. The figure shows also that the milling time of quartzose raw mixtures needed for obtaining clinkers with 0.5% of free CaO are about a half of that of non-quartzose ones, as illustrated in Table 9.

TABLE 6

[Weight percent]

| Items | Ig. | $SiO_2$ | $Al_2O_2$ | $Fe_2O_2$ | CaO | $Na_2O+K_2O$ | Total |
|---|---|---|---|---|---|---|---|
| Raw materials: | | | | | | | |
| Chert | | 96.4 | 2.1 | 0.2 | | 0.3 | 99.0 |
| Opal | 4.2 | 91.3 | 3.9 | 0.2 | | 0.2 | 99.8 |
| Aplite | 0.7 | 76.5 | 13.8 | 0.3 | 0.1 | 8.7 | 100.1 |
| Kaolin | 5.6 | 64.4 | 30.2 | 0.1 | | 0.4 | 100.7 |
| Limestone | 44.0 | | | | 56.1 | | 100.1 |

TABLE 7

[Weight percent]

| | $SiO_2$ | $Al_2O_3+Fe_2O_3$ | CaO | $Na_2O+K_2O$ |
|---|---|---|---|---|
| Chemical composition of clinker | 53.0 | 2.5–2.7 | 44.0 | 0.5–0.4 |

TABLE 8

[Weight proportion]

| Signs of raw mixtures | Quartzose mixture | Opaline mixture |
|---|---|---|
| Raw materials: | | |
| Chert | 501 | |
| Opal | | 553 |
| Aplite | 40 | 33 |
| Kaolin | 26 | |
| Limestone | 684 | 784 |

TABLE 9

| Milling time | Milling time needed for obtaining clinker with 0.5% of free CaO | | The ratios of the milling time needed, O/Q |
|---|---|---|---|
| | Q: Quartzose mixture | O: Opaline mixture | |
| Heating conditions: | | | |
| 1,340° C., 20 min | 85 min | 135 min | 1.6 |
| 1,360° C., 10 min | 75 min | 140 min | 1.9 |
| 1,360° C., 20 min | <60 min | 105 min | 2 |
| 1,380° C., 10 min | <50 min | 93 min | 2 |

In other words, the powers of milling for the forming mixtures are a half of that for the latter. One will expect that the softer the character of the raw mixture, the finer the pulverized powder and hence the more reactive. Our results, however, clarified that the expectation is erroneous. The reason why the raw mixtures prepared through the mix-milling have high reactivity, will be considered by using FIG. 5.

Figure 5:
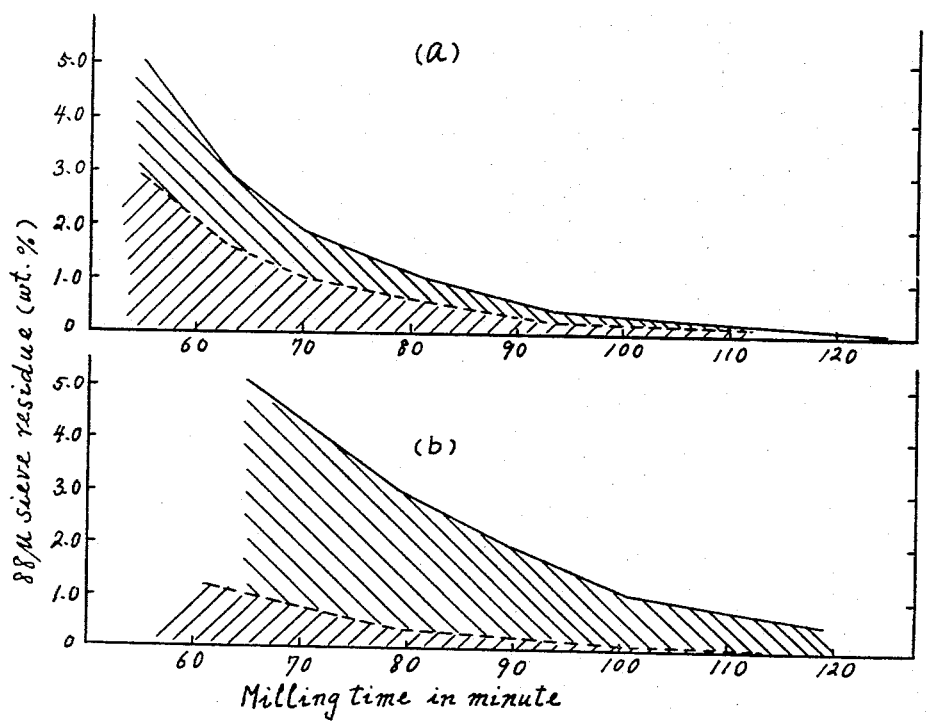

FIG. 5 shows the relationship between the milling time of the raw mixtures and the amount of 88μ sieve residues. 88μ sieve residues were treated with dilute HCl to determine the ratio of the soluble fraction composed of limestone and the insoluble one mainly composed of quartz or opal. As may be seen from FIG. 5, the milling of limestone is promoted by co-existence of harder quartz grains, which play a role of crushing media against limestone.

The finer grain-size of limestone is favourable especially for the synthesis of pseudowollastonite clinkers. $C_3S_2$ is very easily formed in the course of firing reaction, and then the following reaction predominates during firing: $C_3S_2+SiO_2 \rightarrow CaSiO_3$. Therefore, in quartzose raw mixtures with finer-grained limestone, the incomplete reaction results in the formation of the assemblage $$CaSiO_3—SiO_2—C_3S_2$$

while in non-quartzose mixtures with coarser-grained limestone, the incomplete reaction results in the formation of the assemblage $CaSiO_3—SiO_2—C_2S—C_3S_2—CaO$. Thus, in the raw mixtures with simultaneously pulverized limestone and quartzose material, free CaO and $C_2S$ disappear in the early stage of sintering reaction during firing.

It is recommended to use silica bricks in the sintering zone of the rotary kiln. Refractory bricks usually used, such as chamatte-, magnesium spinel-, cordierite-, and dolomite-bricks, are subject to severe chemical erosion by pseudowollastonite clinkers during firing, and hence the life of bricks are shortened to make continuous firing operation impossible, and moreover produced clinkers are contaminated with with the materials from the bricks. This is attributed to the $Al_2O_3$ component contained in large amount in the bricks, as CaO and $SiO_2$ from clinkers and $Al_2O_3$ from these bricks jointly constitute a low melting system. The chrome-magnesia bricks resist the chemical attack by the clinkers, but the contamination or coloring of clinkers by evaporation of Cr or by spalling, pilling or abrasion of bricks, degradates decidedly the quality of clinkers as ceramic raw materials.

We have overcome such difficulties by using silica bricks as refractory material. Silica bricks do not react with the raw mixtures or clinkers and the use of silica bricks in a sintering zone make it possible to manufacture pseudowollastonite clinkers with the rotary kiln constantly and continuously. Commercial silica bricks, having usually the following composition: $SiO_2 92\%$, $Al_2O_3 < 2.5\%$, $Fe_2O_3 < 2.5\%$, $CaO = 1.5–3\%$, may satisfactorily be used in the method of this invention. The chemical composition of silica bricks to be used for this method, however, is not confined to the above range. Especially the CaO content is permitted to be higher up to about 25%. Silica bricks with such high CaO contents are manufactured easily with low cost and moreover the weak resistivity to spalling, which is a feature of ordinary silica bricks, is markedly improved in them. The $Fe_2O_3$ content of the bricks is preferably as low as possible. When the firing of clinkers is done at 1400° C. or higher, the $R_2O_3$ content, i.e. the sum of the contents of $Fe_2O_3$ and $Al_2O_3$, in silica bricks, is recommended to be not higher than 5%.

In order to get white clinkers, it is recommended that fired clinkers be quenched from a temperature higher than 1150° C. The raw materials usually contain some amount of Fe ion, and resulting clinkers have brown or yellowish brown color. We found that in pseudowollastonite clinkers concerned $Fe^{3+}$ ion is probably responsible to the brown color, and $Fe^{2+}$ ion is not. Therefore, the oxidation of $Fe^{2+}$ into $Fe^{3+}$ in the course of cooling must be avoided as far as possible. Through experimental studies, we successfully obtained highly white clinkers by quenching clinkers from 1150° C. or higher temperature.

In practice, quenching may be conveniently done (1) by shooting of cold air to red-hot clinkers, (2) by spraying of water or other solutions of inorganic salts on red-hot clinkers, and (3) by soaking of red-hot clinkers into water or other solutions. These methods (1), (2) and (3) aim to pass quickly the clinkers through the temperature range where oxidation is remarkably proceeded. Especially, the methods (2) and (3) are desirable owing to the combined effect of quenching and shutout of air. In the practice of the method (1), $CO_2$, $CO$, and/or $H_2O$ gas mixed or unmixed with air may also be used preferably. In the methods (2) and (3), the use of solutions which generate reductive gases on quenching, such as $CaOCl_2$ solution and $Na_2SO_3$ solution, may also be effective. Firing in a reductive atmosphere followed by the above-mentioned quenching method is very effective for obtaining white clinkers.

An experimental illustration of this invention will be given below: The chemical composition of the clinkers is shown in Table 10. The clinkers were made from a raw mixtures by firing at 1400° C. The sintered clinkers were slowly cooled with a coling rate of 100° C./hr. The clinkers were quenched just when they reached definite temperatures in the range from 1350° C. to 900° C. Quenched clinkers were pulverized and their reflectivity is measured in comparison with that of the MgO standard powder by using a spectrophotometer. The calculated whiteness is shown in Table 11. The results have clarified that the quenching from 1150° C. or higher is very effective for obtaining white clinkers.

TABLE 10
(Weight percent)

| Ignition Loss | $SiO_2$ | $Al_2O_3$ | $Fe_2O_3$ | CaO | MgO | $Na_2O+K_2O$ | Total |
|---|---|---|---|---|---|---|---|
| 0.08 | 51.0 | 1.7 | 0.4 | 46.2 | 0.3 | Tr. | 99.7 |

The following examples are given as illustrative of the invention, the scope of the said invention, however, not being limited to the specific examples. In all the examples to be described below, the firing was done by a pilot rotary kiln with a diameter of 700 mm. and a length of 8300 mm. and the firing condition will be specified by the temperature of the highest-temperature zone of the rotary kiln and also by the time needed for passage of clinkers through the said kiln. The highest-temperature zone may be 500–1000 mm. in length. In so far as not otherwise stated, a length of about 3000 mm. from the outlet of the kiln, where sintering takes place, was lined with chrome-magnesia bricks. The remaining part of the kiln was lined with chamatte bricks. The mineral compositions of produced clinkers were roughly estimated under the polarization microscope. All the chemical compositions and grain sizes of the raw materials employed in the following examples are shown in Table 12.

TABLE 11
(Weight percent)

| Items | Temperatures from which clinkers were quenched | | | |
|---|---|---|---|---|
| | 1,350 | 1,250 | 1,150 | 1,000 |
| Methods of treatment: | | | | |
| Water immersion | 92 | 90 | 88 | 82 |
| Water spray | 89 | 88 | 87 | 82 |
| Air brow | 88 | 86 | 85 | 81 |
| Slow cool | | | 79 | |

TABLE 12

| Items | Ig. loss (wt. percent) | Chemical compositions (wt. percent) | | | | | | | | Grain sizes 88µ sieve residue (percent) |
|---|---|---|---|---|---|---|---|---|---|---|
| | | $SiO_2$ | $Al_2O_3$ | $Fe_2O_3$ | CaO | MgO | $Na_2O$ | $K_2O$ | Others | |
| Raw materials: | | | | | | | | | | |
| 1. Limestone | 43.8 | 0.4 | 0.2 | 0.1 | 54.4 | 1.1 | Tr. | Tr. | | 0.9 |
| 2. Quick lime | | 0.7 | 0.4 | 0.2 | 97.0 | 1.7 | Tr. | Tr. | | 1.0 |
| 3. Slaked lime | 25.5 | | 0.1 | | 73.8 | 0.6 | Tr. | Tr. | | 1.0 |
| 4. Quartzose chert | 0.2 | 97.5 | 2.0 | 0.5 | Tr. | | | | | 1.0 |
| 5. Quartz sand | 0.3 | 99.0 | 0.2 | 0.1 | | | | | | 1.0 |
| 6. Opaline rock | 5.7 | 90.8 | 3.0 | 0.3 | | | | | | 1.1 |
| 7. Kaolin clay | 6.5 | 78.3 | 15.0 | 0.2 | Tr. | Tr. | Tr. | Tr. | | 0.7 |
| 8. Feldspar | 0.7 | 76.5 | 13.8 | 0.3 | 0.1 | | 4.3 | 4.3 | | 1.0 |
| 9. Petalite | 0.8 | 75.1 | 16.9 | 0.1 | 0.5 | 0.1 | 0.4 | 0.1 | [1] 4.7 | |
| 10. Pyrophyllite rock | 4.6 | 81.1 | 11.9 | 0.5 | | | 0.5 | 1.0 | | 0.9 |
| 11. Coastal sand | 0.6 | 96.0 | 1.6 | 0.3 | Tr. | | 0.5 | 0.6 | | 1.0 |
| 12. Limestone | 42.8 | 2.2 | 0.4 | 0.2 | 53.0 | 1.1 | | | | |
| 13. Quartzose rock | 1.0 | 97.0 | 1.2 | 0.3 | | | 0.2 | | [2] 0.5 | |
| 14. Coastal sand | 0.5 | 84.3 | 10.8 | 0.5 | | | 0.4 | Tr. | | (³) |
| 15. Opaline rock | 3.9 | 92.4 | 1.7 | 0.2 | Tr. | | | | [2] 1.0 | |
| 16. Feldspar | 1.1 | 76.5 | 13.0 | 0.4 | 0.1 | | 8.0 | | | |
| 17. Quartzose chert | 0.1 | 88.1 | 1.0 | 0.2 | | | 0.5 | | | |
| 18. Limestone | 43.6 | 0.3 | 0.1 | 0.1 | 55.4 | 1.1 | | | | (⁴) |
| 19. Feldspar | 0.9 | 76.5 | 13.7 | 0.2 | 0.3 | | | 8.4 | | |

[1] $Li_2O$.  [2] $TiO_2$.  [3] 2–3 mm. under.  [4] 30 mm. under.

Example 1

Limestone, quartzose chert and kaolin clay, with the chemical compositions and grain sizes shown in Table 12, Nos. 1, 4 and 7 respectively were well mixed together in the ratio 0.800:0.484:0.071 by weight respectively. The raw mixture was moistened with water; the ratio of water to the raw mixture was 16:100 by weight. Then, it was granulated by a pan-pelletizer into pellets, 10–20 mm. in diameter. Pelletized raw mixture was directly charged into the pilot kiln and calcined with the clinker-output of 150 kg./hr. at the firing condition of 1390° C. and 30 min. Produced clinker contained 80% of pseudowollastonite with only a little amount of $C_2S$ and was lacking in free CaO, and was of good quality.

Example 2

Limestone and quartzose chert, with the chemical compositions and grain sizes shown in Table 12, Nos. 1 and 4 respectively, were mixed together with $BaO \cdot 2B_2O_3$ powder in the ratio 0.724:0.543:0.050 in weight respectively. The raw mixture was moistened with water containing 2% of dextrin; the ratio of water to the raw mixture was 17:100 by weight. Then, it was granulated into pellets, 10–20 mm. in diameter, and calcined with the clinker-output of 150 kg./hr. at the firing condition of 1350° C. and 30 min. Produced clinker contained 90% of pseudowollastonite and was lacking in both CaO and $C_2S$ and was of good quality.

Example 3

Limestone, quartzose chert and petalite, with the chemical compositions and grain sizes shown in Table 12, Nos. 1, 4, and 9 respectively, were well mixed together in the ratio 0.786:0.415:0.145 by weight respectively. The raw mixture was moistened with water; the ratio of water to the raw mixture was 17:100 by weight. Then, it was granulated into pellets, 10–20 mm. in diameter, and calcined with the clinker-output of 160 kg./hr. at the firing condition of 1380° C. and 30 min. Produced clinker contained 90% of pseudowollastonite with only a small amount of $C_2S$ and free from free CaO and was of good quality.

EXAMPLE 4

Limestone and quartzose chert, with the chemical compositions and grain sizes shown in Table 12, Nos. 1 and 4 respectively, were mixed together in the ratio 0.818:0.521 by weight respectively. The raw mixture was moistened with 25% NaOH solution in an amount of 10%, and then mixed well by a mixer. The raw mixture was compressed between rollers under a pressure of 150 kg./cm.$^2$ into flakes, 15 mm. in thickness, and the flakes were directly charged into the pilot kiln and calcined with the clinker-output of 150 kg./hr. at the firing condition of 1370° C. and 30 min. Immediately after the calcination, water is sprayed upon red-hot clinker for quenching. Red-hot clinker just prior to quenching was at temperature of 1200° C.–1300° C. Thus, obtained clinker was very pale in color, but the clinker not quenched was light brown in color to the naked eye. Produced clinker contained 90% of pseudowollastonite with $C_2S$ only in a negligible amount and lacking in free CaO and was of good quality.

EXAMPLE 5

Slaked lime, pyrophyllite rock and coastal sand, with the chemical compositions and grain sizes shown in Table 12, Nos. 3, 10 and 11 respectively, were mixed together in the ratio 0.591:0.148:0.422 by weight respectively. The raw mixture was moistened with water; the ratio of water to the raw mixture was 17:100 by weight. Then, it was granulated into pellets, 10–20 mm. in diameter, and the pellets were directly charged into the pilot kiln with the lining of silica bricks having the character shown in Table 13, instead of chrome-magnesia bricks; a length of about 3000 mm. from the outlet of the kiln was lined with silica bricks and the remaining 5000 mm. with chamatte bricks, and calcined with the clinker-output of 180 kg./hr. at the firing condition of 1380° C.–1420° C. and 30 min. Immediately after the calcination, red-hot clinkers were fallen into water to be quenched. Red-hot clinkers just prior to quenching were at temperature of 1200°–1300° C. The quenched clinker was pulverized and its reflectivity was measured in comparison with that of MgO standard powder by using spectrometer. The pulverized clinker was found to have high whiteness of 92% and contained 90% of psuedowollastonite and was lacking in free CaO and $C_2S$ and was of good quality.

TABLE 13

| | |
|---|---|
| Refractoriness (SK) | >33 |
| Apparent specific gravity | 2.32 |
| Bulk specific gravity | 1.92 |
| Porosity (percent) | 17.5 |
| Compressive strength (kg./cm.$^2$) | 507 |
| Chemical composition (wt. percent): | |
| $SiO_2$ | 92 |
| $Al_2O_3$ | 2.0 |

EXAMPLE 6

Limestone, slaked lime and quartzose chert, with the chemical compositions and grain sizes shown in Table 12, Nos, 1, 3 and 4 respectively, were mixed together with the $PbO \cdot Al_2O_3 \cdot SiO_2$ in the ratio 0.236:0.410:0.525:0.038 respectively. The raw mixture was moistened with water containing 0.5% of wheat and well mixed; the ratio of water to the raw mixture was 16:100 by weight. It was granulated into pellets, 10–20 mm. in diameter, and then directly charged into the pilot kiln and calcined with the clinker contained 90% of pseudowollastonite with only a small amount of $C_2S$ and without free CaO and was of good quality.

EXAMPLE 7

Limestone, quick lime, quartzose chert and feldspar, with the chemical compositions and grain sizes shown in Table 12, Nos. 1, 2, 4 and 8 respectively, were mixed in the ratio 0.238:0.317:0.478:0.072 respectively. The raw mixture was compressed between rollers under a pressure of 300 kg./cm.$^2$ into flakes, 15 mm. in thickness. The flakes were directly charged into the pilot kiln and calcined with the clinker-output of 200 kg./hr. at the firing condition of 1370° C. and 30 min. The produced clinker contained 85% of pseudowollastonite and free CaO in a negligible amount and $C_2S$ in a small amount and was of good quality.

EXAMPLE 8

Limestone,, quick lime, slaked lime, quartzose chert and kaolin clay with the chemical compositions and grain sizes shown in Table 12, Nos. 1, 2, 3, 4 and 7 were mixed together in the ratio 0.240:0.159:0.208:0.480:0.075 respectively. The raw mixture was compressed between rollers under a pressure of about 200 kg./cm.$^2$ into flakes, 15 mm. in thickness. The flakes were then directly charged into the pilot kiln and calcined at the firing condition of 1370° C. and 30 min. The produced clinker contained 80% of pseudowollastonite and free CaO in a negligible amount and $C_2S$ in a very small amount and was of good quality.

EXAMPLE 9

Limestone, quick lime, slaked lime and quartzose chert, with the chemical compositions and grain sizes shown in Table 12, Nos. 1, 2, 3 and 4 respectively. The raw mixture was compressed between rollers under a pressure of about 300 kg./cm.$^2$ into flakes, 10 mm. in thickness. The flakes were then directly charged into the pilot kiln and calcined with the clinker-output of 200 kg./hr. at the firing condition of 1360° C. and 30 min. The produced clinker contained 95% of pseudowollastonite and both free CaO and $C_2S$ only in a negligible amount and was of good quality.

EXAMPLE 10

Limestone, quartzose chert, opaline rock and kaolin clay, with the chemical compositions and grain sizes shown in Table 12, Nos. 1, 4, 6 and 7 respectively, were mixed together in the ratio 0.801:0.202:0.325:0.044 respectively. The raw mixture was moistened with water containing 0.5% of polyvinylalcohol and well mixed; the ratio of water to the raw mixture was 15:100. Then, it was granulated by a pan-pelletizer into pellets, about 10 mm. in diameter, and directly charged into the pilot kiln and calcined with the clinker-output of 180 kg./hr. at the firing condition of 1370° C. and 30 min. The produced clinker contained 85% of pseudowollastonite with only a small amount of $C_2S$ and was lacking in free CaO and was of good quality.

EXAMPLE 11

Lime and opaline rock, with the chemical compositions and grain sizes shown in Table 12, Nos. 2 and 6 respectively, were mixed well together with soda ash in the ratio 0.451:0.571:0.020 respectively. The raw mixture was compressed between rollers under a pressure of 300 kg./cm.² into flakes, 15 mm. in thickness, and directly charged into the pilot kiln and calcined with the clinker-output of 250 kg./hr. at the firing condition of 1370° C. and 30 min. The produced clinker contained 90% of pseudowollastonite with a negligible amount of free CaO and and $C_2S$ and was of good quality.

EXAMPLE 12

Limestone, slaked lime, quartzose chert and opaline rock, with the chemical compositions and grain sizes shown in Table 12, Nos. 1, 3, 4 and 6 respectively, were well mixed together with $Na_2B_4O_7$ in the ratio 0.125:0.315:0.141:0.388:0.030 respectively. The raw material was compressed between rollers under a pressure of 200 kg./cm.² into flakes, 10 mm. in thickness, and then directly charged into the pilot kiln and calcined with the clinker-output of 220 kg./hr. at the firing condition of 1360° C. and 30 min. The produced clinker contained 90% of pseudowollastonite and negligible amount of free CaO and $C_2S$ and was of good quality.

EXAMPLE 13

Limestone, quartzose rock from a silicified zone around a pyrophyllite deposit and feldspar, with the chemical compositions and grain sizes shown in Table 12. Nos. 12, 13, and 16 respectively, were mixed in the ratio 0.799:0.442:0.112 respectively. The raw mixture was charged continuously at the rate of 150 kg./hr. into a close-circuit pilot ball mill, 600 mm. in diameter and 780 mm. in length, and pulverized with 300 kg. of steel balls and cylpebbs as grinding media at 38 r.p.m. into powder with 3% residue on 88μ sieve. The pulverized raw mixture was granulated in the same way as in Example 5 and calcined with the clinker-output of 170 kg./hr. at the firing condition of 1380° C. and 30 min. Produced clinker contained 90% of pseudowollastonite with both free CaO and $C_2S$ and was of good quality.

EXAMPLE 14

Limestone, quartzose rock from a silicified zone around a pyrophyllite deposit, coastal sand and opaline rock, with the chemical compositions and grain sizes shown in Table 12, Nos. 12, 13, 14 and 15 respectively, were mixed together in the ratio 0.811:0.119:0.228:0.202 respectively. The raw mixture was pulverized in the same way is in Example 13 into powder with 2% residue on 88μ sieve. The pulverized raw mixture was granulated in the same way as in Example 5 and calcined with the clinker-output of 180 kg./hr. at the firing condition of 1380 C. and 30 min. The produced clinker contained 90% of pseudowallastonite with only 3% of $C_2S$ and was free from free CaO and is of good quality.

EXAMPLE 15

Limestone, quartzose rock from a silicified zone around a pyrophyllite deposit and feldspar, with the chemical compositions and grain sizes shown in Table 12, Nos. 12, 13 and 16 respectively, were mixed in the ratio 0.799:0.442:0.112 respectively. The raw mixture was charged continuously at the rate of 750 kg./hr. into a vibration mill, 370 mm. in diameter and 420 mm. in length, with 160 kg. of steel balls as grinding media and vibration frequency of 1200 cycle/min. and pulverized into poyder with 2% residue on 88μ sieve. The pulverized powder was granulated in the same way as in Example 5 and calcined with the clinker-output of 170 kg./hr. at the firing condition of 1400° C. and 30 min. The produced clinker contained 85% of pseudowollastonite with only a small amount of $C_2S$ and was lacking in free CaO and was of good quality.

EXAMPLE 16

Limestone, quartzose chert and feldspar, with chemical compositions and grain sizes shown in Table 12, Nos. 17, 18, and 19 respectively, were measured in the ratio 0.792:0.416:0.134 respectively. The raw mixture were charged continuously at the rate of 4 tons/hr. into a close-circuit ball mill with 20 tons of steel balls as grinding media and pulverized into powder with 3% residue on 88μ sieve. The pulverized powder was granulated into pellets, 10–20 mm. in diameter, after moistened with water; the ratio water to the raw mixture was 17:100 by weight. The firing of the pellets was done by the pilot rotary kiln with the lining of silica bricks having the character shown in Table 14 instead of chrome-magnesia bricks; the zone about a length of 3000 mm. from the outlet of the kiln inwards was lined with silica bricks and the remaining 5000 mm. with chamatte bricks. The firing was continued for 10 days with the clinker-output of 170 kg./hr. at the firing condition of 1380°–1400° C. and 30 min. The detailed observation on the kiln bricks after firing clarified that the silica bricks were not subjected to chemical attack by the clinker or the raw material. Produced clinker was free from any contamination injurious for use as a ceramic raw material and was lacking in free CaO and contained 85% of pseudowallostonite with only a small amount of $C_2S$ and was of good quality.

TABLE 14

| | |
|---|---|
| Refractoriness (SK) | 32 |
| Apparent specific gravity | 2.32 |
| Bulk specific gravity | 1.76 |
| Porosity (percent) | 23.9 |
| Compressive strength (kg./cm.²) | 369 |
| Chemical composition (wt. percent): $SiO_2$ | 94 |
| Chemical composition (wt. percent): $Al_2O_3$ | 1.4 |

What is claimed is:

1. A method for the preparation of pseudowollastonite clinker which comprises preparing a raw mixture powder consisting of a limy raw material composed at least of one matter selected from limestone, quick lime, slaked lime and wollastonite and of a silicic raw material composed at least of one matter selected from quartz, cristobalite, tridymite and amorphous silica, together with at least one matter selected from those containing at least one element of Li, Na, K, Ba, Pb, Zn, Ti, Al, Fe, B and P as a flux, so that the molecular ratio of $CaO/SiO_2$ the produced clinker is in the range of 0.5–1..0, forming it into compact grains and sintering the compact grains by using the rotary kiln at a temperature in the range of 1250°–1470° C.

2. A method as claimed in claim 1, wherein the raw mixture powder is compressed into compact grains under a pressure higher than 50 kg./cm.².

3. A method as claimed in claim 2, wherein the raw mixture powder is moistened with at least one binder selected from water, aqueous solutions containing starch, cellulose, seaweed, plastic clay, water glass and other inorganic matters, mineral and vegetable oils and spent liquor from pulp-making.

4. A method as claimed in claim 1, wherein the raw mixture powder is granulated into compact rounnded shapes by means of the granulater using at least one binder selected from water, aqueous solutions containing starch, cellulose, seaweed, plastic clay, water glass and other inorganic matters, mineral and vegetable oils and spent liquor of pulp-making.

5. A method as claimed in claim 1, wherein the raw mixture with the grain size of less than 8% residue by weight on the $88\mu$ sieve as a whole and containing the limy raw material finer in grain size than the silicic raw material, is used.

6. A method as claimed in claim 1, wherein at least one matter selected from those oxides, hydroxides, alkalies, carbonates, fluorides, phosphates, borates, silicates, aluminosilicates and glasses which contain at least one element of the elements of the group A containing Li, Na, K, Ba, Pb, B and P, is jointly used as a flux with at least one matter selected from those oxides, hydroxides, carbonates, fluorides, phosphates, borates, silicates, aluminosilicates and glasses which contain at least one element of the elements of the group B containing Al, Fe, Zn, Ti and Zr, so that in the produced clinker the sum of the contents of the elements of the group A is in the range of 0.5–4.0% by weight on an oxide basis and the sum of the contents of the elements of the group B is 0–6% by weight on an oxide basis.

7. A method as claimed in claim 1, wherein at least one matter selected from those oxides, hydroxides, alkalies, carbonates, fluorides, phosphates, borates, silicates, aluminosilicates and glasses which contain at least one element of the elements of the group A containing Li, Na, K, Ba, Pb, B and P, is jointly used as a flux with at least one matter selected from those oxides, hydroxides, carbonates, fluorides, phosphates, borates, silicates, aluminosilicates and glasses which contain at least a one element of the elements of the group B containing Al, Fe, Zn, Ti and Zr, so that in the produced clinker the sum of the contents of the elements of the group A is in the range of 0–4.0% by weight on an oxide basis and the sum of the contents of the elements of the group B is in the range of 1.0–6.0% by weight on an oxide basis.

8. A method as claimed in claim 6, wherein a limy raw material, more than 50% by weight of which is composed at least of one matter of quick lime and slaked lime, is used.

9. A method as claimed in claim 7, wherein a limy raw material, more than 50% by weight of which is composed at least one matter of quick lime and slaked lime, is used.

10. A method as claimed in claim 6, wherein a silicic raw material, more than 50% by weight of which is composed at least of one matter of oristobalite, tridymite and amorphous silica, is used.

11. A method as claimed in claim 7, wherein a silicic raw material, more than 50% by weight of which is composed at least of one matter of cristobalite, tridymite and amorphoust silica, is used.

12. A method as claimed in claim 6, wherein a limy raw material, more than 50% by weight of which is composed at least of one matter of quick lime and slaked lime, is jointly used with a silicic raw material, more than 50% by weight of which is composed at least of one matter of cristobalite, tridymite and amorphous silica.

13. A method as claimed in claim 7, wherein a limy raw material, more than 50% by weight of which is composed at least of one matter of quick lime and slaked lime, is jointly used with a silicic raw material, more than 50% by weight of which is composed at least of one matter of cristobalite, tridymite and amorphous silica.

14. A method as claimed in claim 1, wherein the shaped raw mixture is sintered at a temperature in the range of 1250°–1470° C. by using the rotary kiln, the sintering zone of which is lined with silica bricks.

15. A method as claimed in claim 1, wherein the fired clinker is quenched from a temperature higher than 1150° C.

16. A method as claimed in claim 5, wherein limestone as a limy raw material is pulverized together with a quartzose raw material as a silicic raw material simultaneously in a mill.

17. Pseudowollastonite clinker prepared by the method claimed in claim 1.

References Cited

UNITED STATES PATENTS 1,904,699  4/1933  Singmaster _____ 263—53

FREDERICK L. MATTESON JR., *Primary Examiner.*

J. J. CAMBY, *Assistant Examiner.*